United States Patent [19]
Williams et al.

[11] Patent Number: 5,531,907
[45] Date of Patent: Jul. 2, 1996

[54] TREATMENT OF AGRICULTURAL WASTE

[75] Inventors: Paul J. Williams; Susan Tolkien, both of Cheshire, England

[73] Assignee: Nalco Limited, Cheshire, United Kingdom

[21] Appl. No.: 298,407

[22] Filed: Aug. 30, 1994

[51] Int. Cl.$^6$ ..................................................... C02F 1/52
[52] U.S. Cl. ........................ 210/727; 210/728; 210/736; 210/903; 210/906; 210/735
[58] Field of Search ..................................... 210/705, 723, 210/725, 726, 727, 728, 735, 736, 903, 906

[56] References Cited

U.S. PATENT DOCUMENTS

| | | | |
|---|---|---|---|
| 3,928,195 | 12/1975 | Hoeltgen et al. | 210/724 |
| 3,956,122 | 5/1976 | Coscia et al. | 210/734 |
| 4,388,195 | 6/1983 | von Hagel et al. | 210/725 |
| 4,450,092 | 5/1984 | Huang | 210/728 |
| 4,559,146 | 12/1985 | Roets | 210/705 |
| 4,566,986 | 1/1986 | Waldmann | 210/723 |
| 4,800,039 | 1/1989 | Hassick et al. | 210/727 |
| 4,929,655 | 5/1990 | Takeda et al. | 524/458 |
| 5,178,774 | 1/1993 | Payne et al. | 210/727 |
| 5,294,348 | 3/1994 | Horny et al. | 210/726 |

FOREIGN PATENT DOCUMENTS 816399  7/1959  United Kingdom .................. 210/928

OTHER PUBLICATIONS

"The NALCO Water Handbook", 1979, McGraw–Hill, pp. 8–4 to 8–6.

Primary Examiner—Peter A. Hruskoci
Assistant Examiner—Theodore M. Green
Attorney, Agent, or Firm—Hill, Steadman & Simpson

[57] ABSTRACT

The present invention provides a method for purifying agricultural waste. The method includes the steps of adding effective amounts of at least one polymer flocculent, at least one coagulant, and at least one precipitant. The combined effect of the various components of the present invention not only purifies the agricultural waste but also yields a dewatered organic mass for composting to act as a peat replacement.

11 Claims, 9 Drawing Sheets

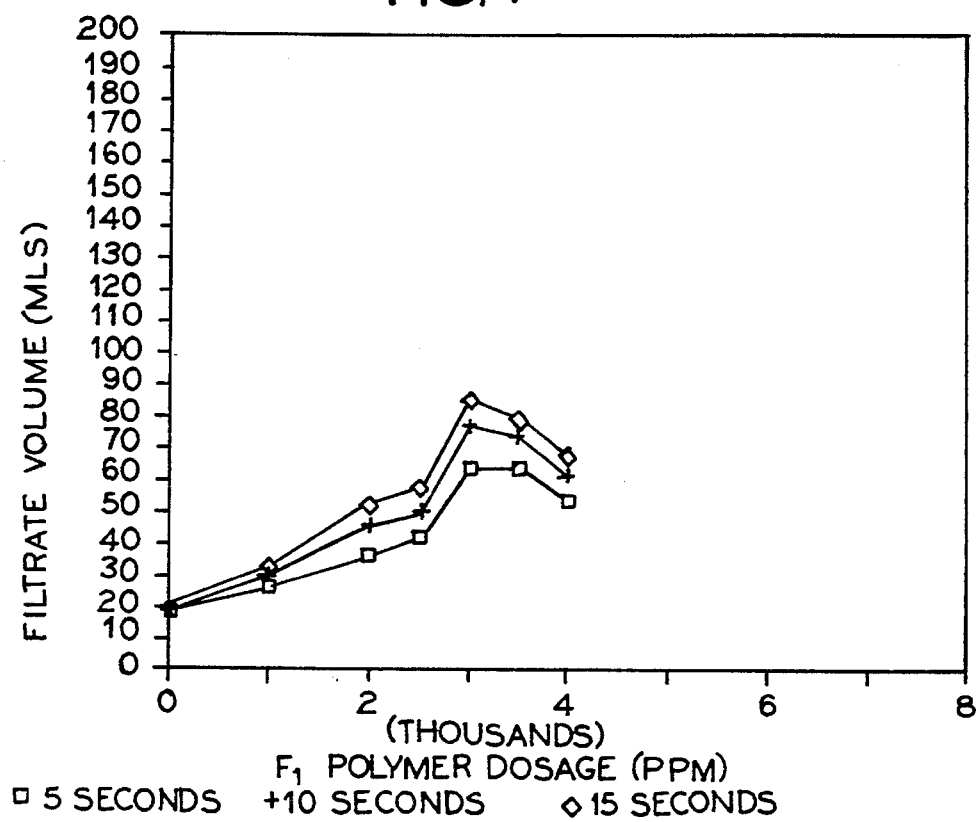
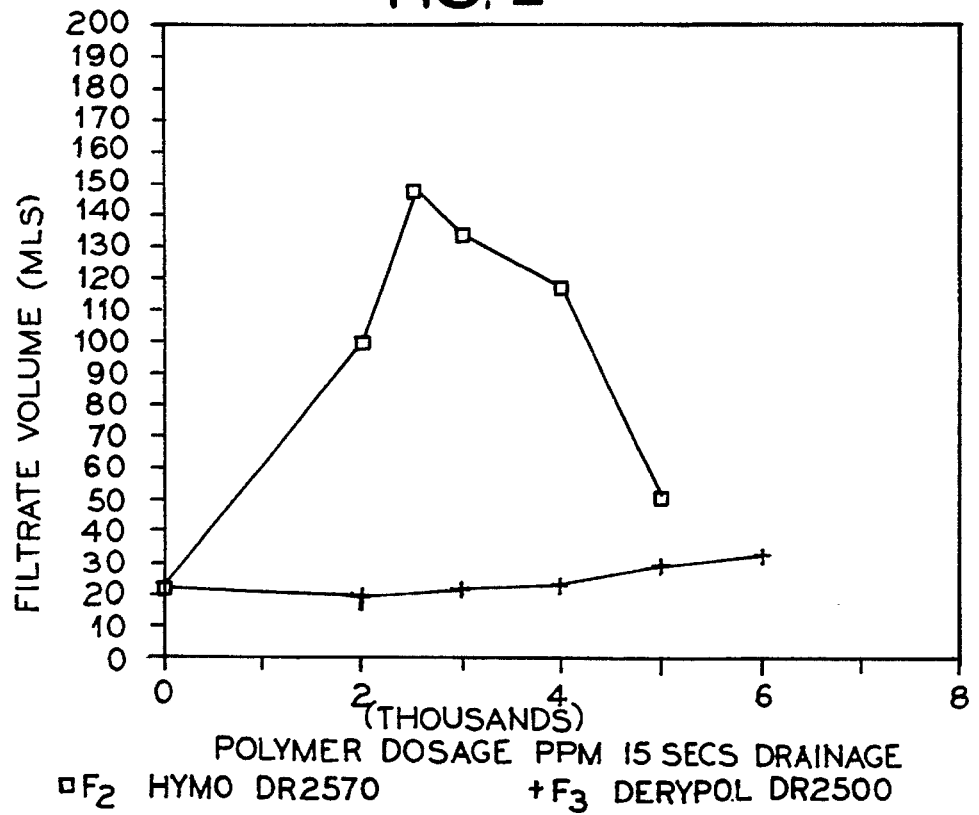

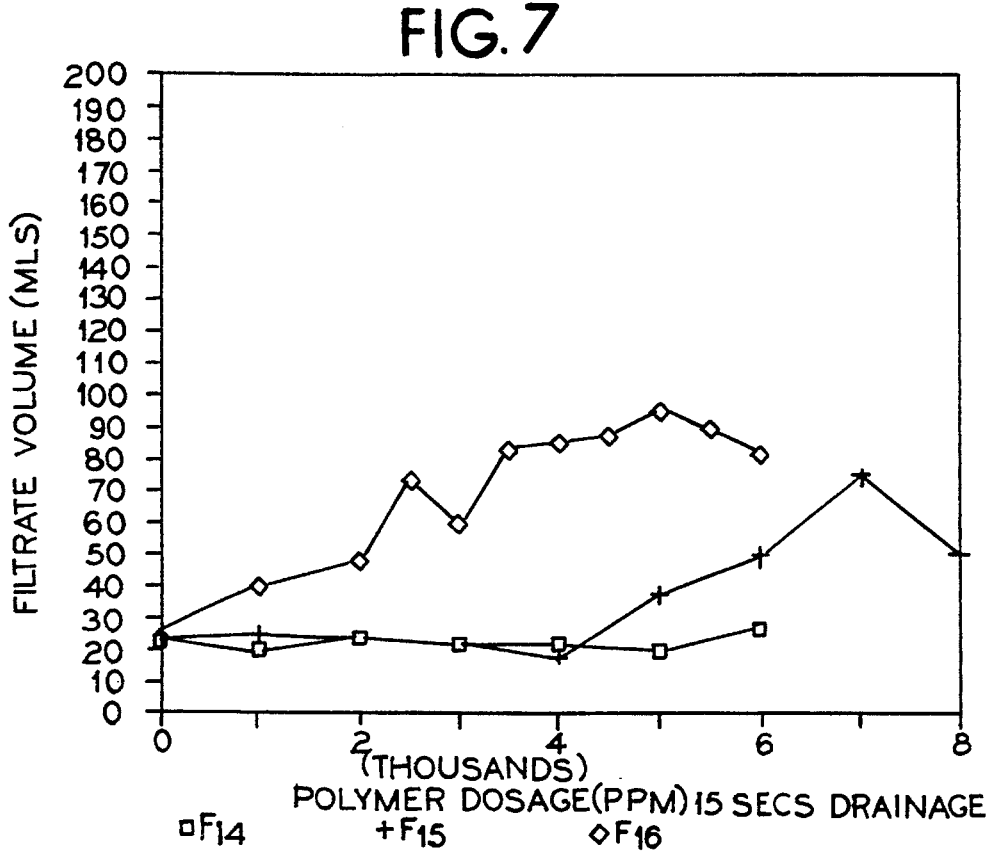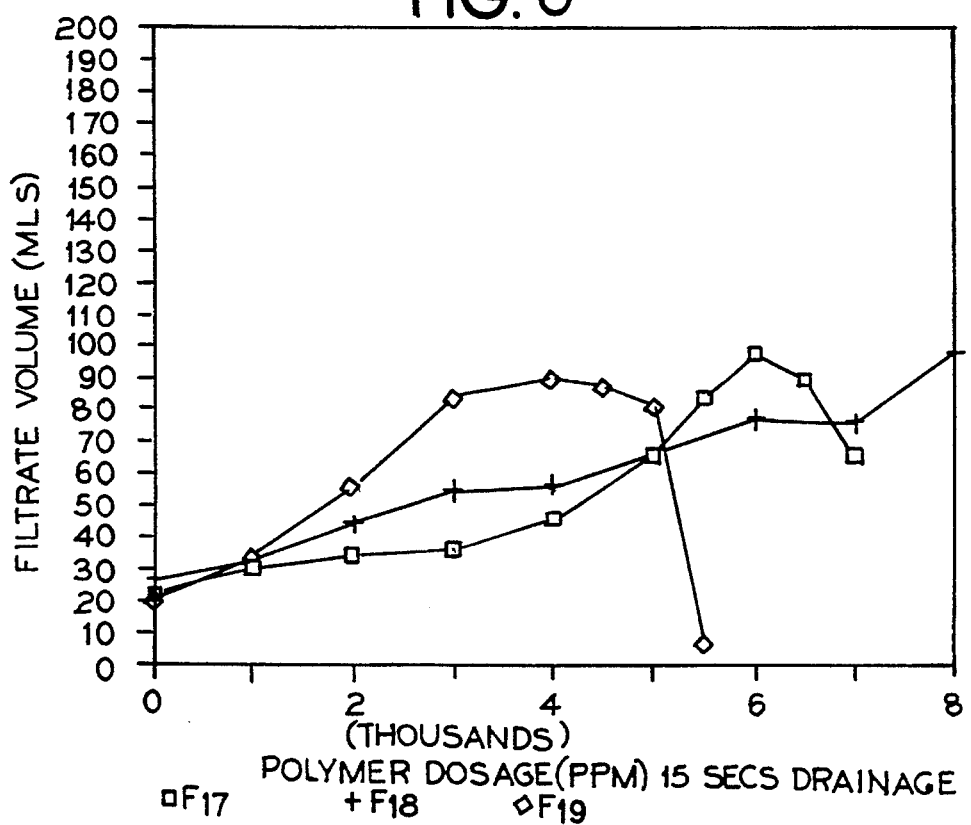

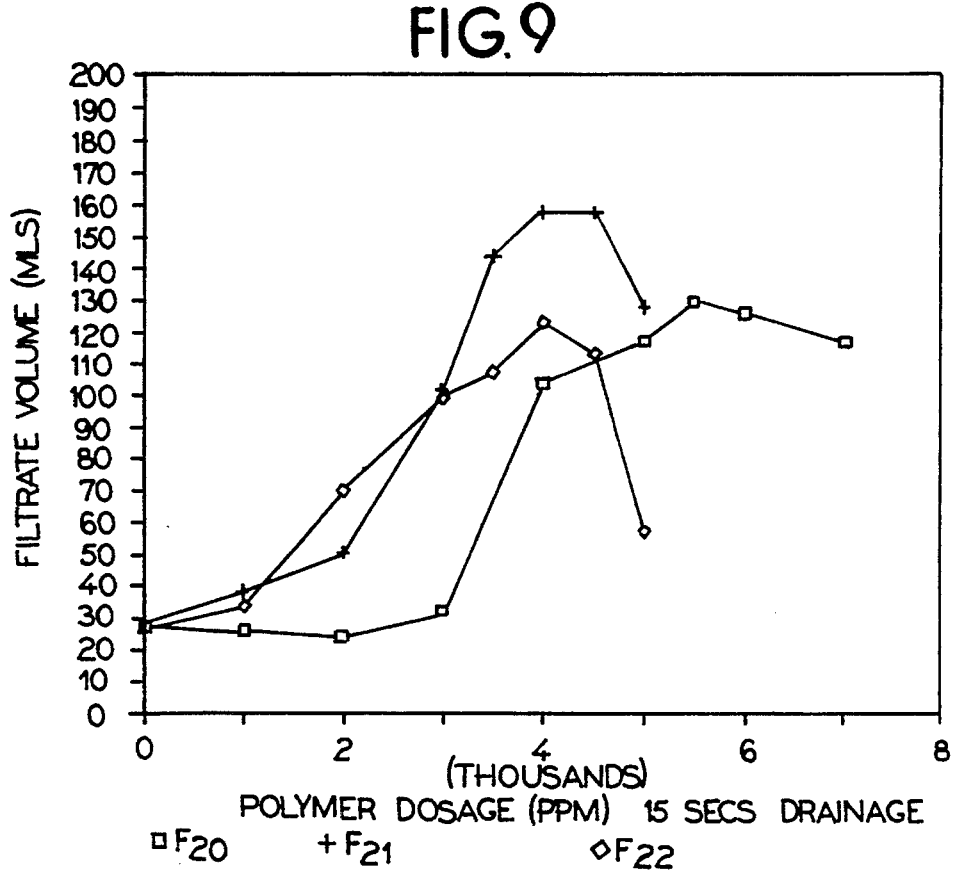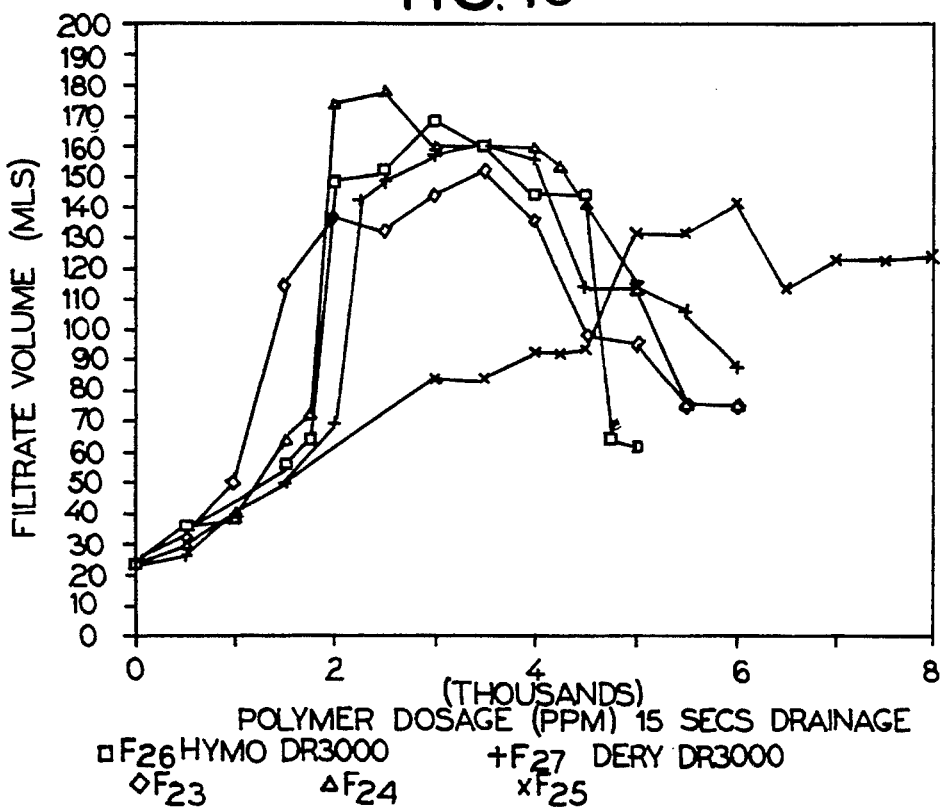

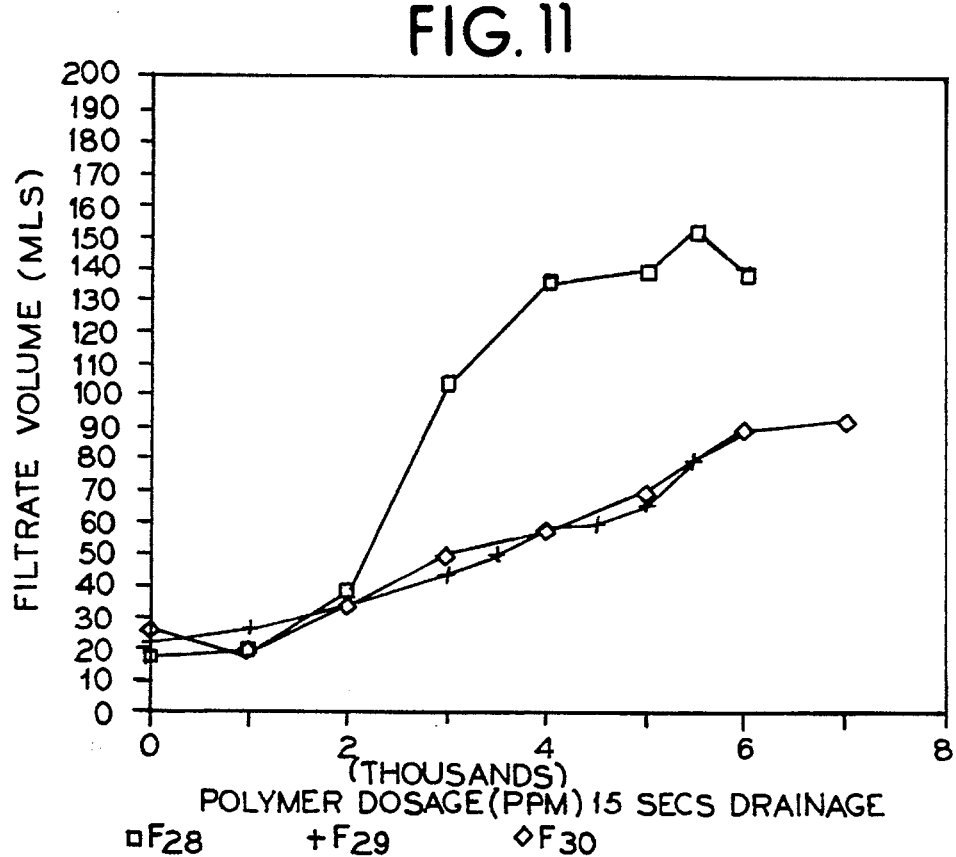
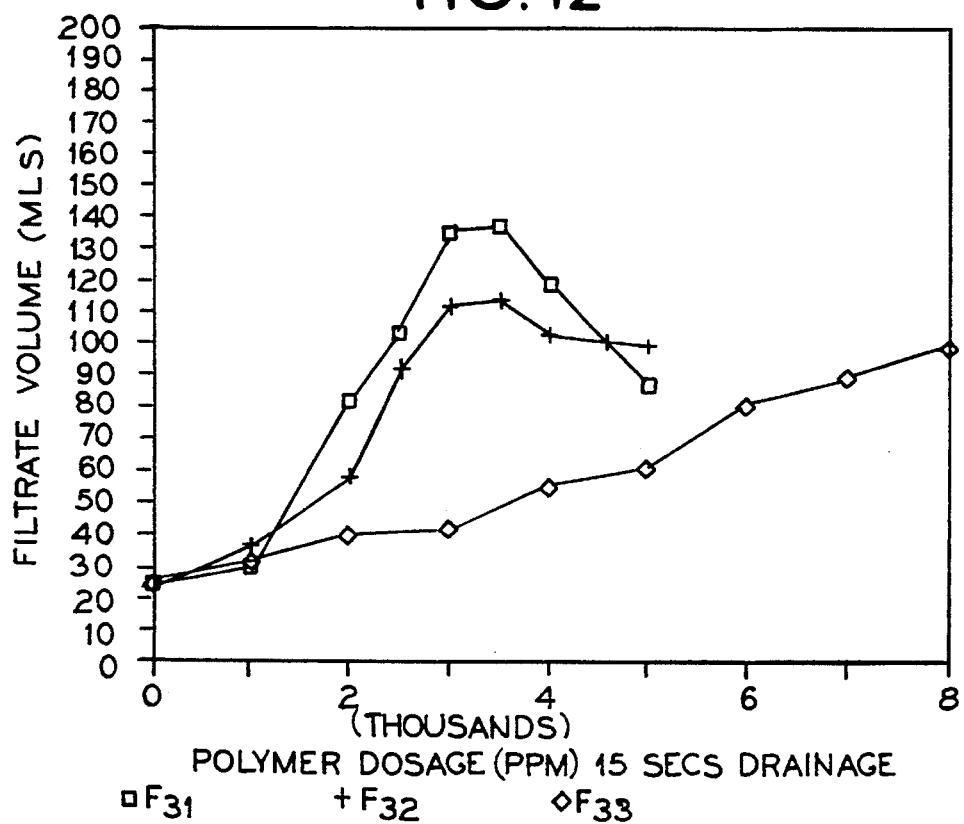

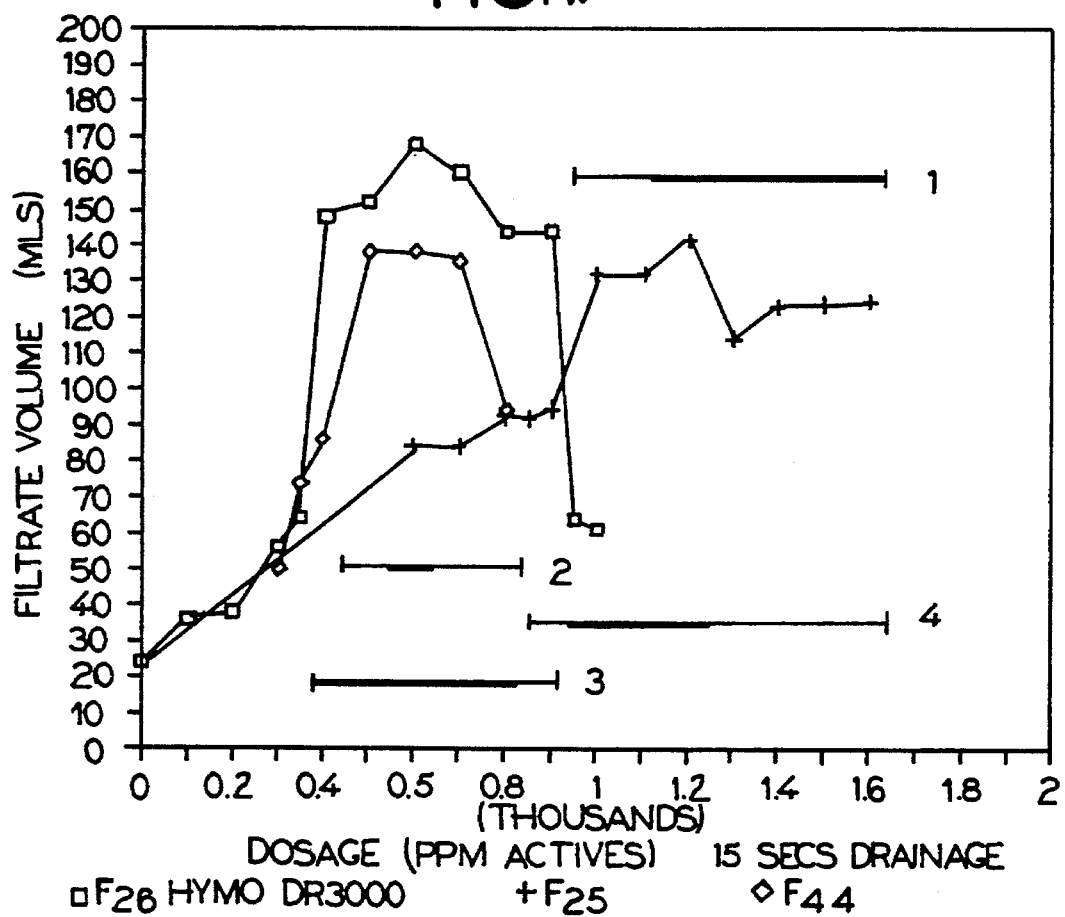

TREATMENT OF AGRICULTURAL WASTE

BACKGROUND OF THE INVENTION

The present invention relates generally to the treatment of agricultural waste. More particularly, the present invention provides a chemical treatment method that effectively removes biological oxygen demand, chemical oxygen demand, ammonia, phosphate and solids from agricultural waste, resulting in an environmentally acceptable agri-waste.

The agricultural community faces never-ending concerns regarding the disposal and spreading of agricultural waste onto land. As new environmental legislation is enforced, the agricultural community is finding itself under increased scrutiny. Among other matters, the agricultural community is concerned with the very high pollution potential of farm slurries. The high pollution potential results from a very high biological oxygen demand ("BOD"), a high chemical oxygen demand ("COD"), as well as the ammonia content in agricultural waste.

In addition to the lowering of pollution potential, the agricultural community strives to reduce slurry volume. The reduction of slurry volume provides environmental advantages. For instance, the reduction of slurry volume can alleviate the need for large holding tanks. Moreover, since a reduced slurry volume lessens the number of times heavy machinery passes over the land, spreading is less time-consuming and less arduous on the land. Still further, the reduction of slurry volume reduces the possibility of runoff onto local water courses.

While a definite need exists for the treatment of agricultural waste, none of the present methods available adequately deal with the complete treatment and disposal of composite farm waste. For instance, some have resorted to the selling of nitric acid systems to control odor and restrict evolution of ammonia gas from storage slurries. Others have proposed the use of high pressure filtration systems in the removal of suspended solids from slurry. Still further, others are proposing the use of centrifugation of composite farm waste. However, the use of filtration and centrifugation systems have been questioned due to their high capital costs.

Yet another proposed treatment method is the use of anaerobic and aerobic digestion. While in theory such digestion methods may prove useful, they also require high capital investment. Moreover, such digestion methods do not necessarily produce environmentally acceptable outflow, and do not immediately yield material for composting.

A further concern with anaerobic and aerobic digestion is that they require large areas of space as well as technical support and service, neither of which are particularly common within agri-business. Moreover, such digestion methods are to an extent inhibited during periods of low temperature. Thus, although many have proposed different methods for treating agricultural waste, none of the proposed methods are being implemented on any significant scale.

Accordingly, the current options for waste treatment are limited. At present, farm waste is generally recycled via lagoon collection and intermittent slurry application onto land. However, as a result of the new Environmental Protection Act (1991), the National Rivers Authority Proposals for Protection of Groundwater, and the new Control of Pollution Regulations (1991), restrictions are now being placed upon how waste is collected and re-used. Conceivably, regulations will be enacted that control the use of such agricultural waste. For instance, regulations will likely place a ban on the application of waste to certain areas of top grade agricultural lands, such as soils in lowland sand and gravel outwash plains.

In the event such regulations are enacted, the agricultural waste will then have to be disposed off-site. However, even if disposal sites can be found, the shipment of slurry to off-site disposal will be expensive.

Therefore, a need exists for a treatment system that addresses all the environmental concerns presented by agricultural waste, while at the same time not involving high capital costs.

SUMMARY OF THE INVENTION

The present invention provides a method for purifying agricultural waste that produces an environmentally acceptable agri-waste. The method of the present invention yields a dewatered organic mass that is ready for composting or for controlled spreading.

In an embodiment, the method of the present invention comprises the steps of adding at least one polymer flocculent to the agricultural waste to bridge suspended solids together, adding at least one coagulant to the agricultural waste to convert dissolved solids into suspended solids, and adding at least one precipitant to the agricultural waste to facilitate the removal of unwanted soluble components from the agricultural waste.

In an embodiment, the polymer flocculent may be either a latex polymer or a dispersion polymer.

In an embodiment, the coagulant is chosen from the group consisting of: an inorganic coagulant such as ferric sulphate; an organic coagulant such as epichlorohydrin-dimethylamine condensation polymer; polydiallyl-dimethyl ammonium chloride organic polymer; or mixtures of inorganic and organic coagulants.

In an embodiment, the precipitant is chosen from the group consisting of: alkaline sodium aluminate liquor; or acidic magnesium salt in phosphoric acid/magnesium phosphate solution.

While the method of the present invention provides a complete chemical treatment for purifying agricultural waste, naturally the components of the present invention may be added individually to obtain specific desired results. For instance, in an embodiment, the polymer flocculent is added alone to dewater the agricultural waste. Likewise, individual applications of either the coagulant or precipitant allow for the removal of particular constituents from the agricultural waste. Still further, two of the three constituents, e.g. the coagulant and the flocculent, can be used in combination.

An advantage of the present invention is that it provides a complete treatment system that meets all the environmental concerns presented by agricultural waste.

Another advantage of the present invention is that it yields a dewatered organic mass ready for composting to satisfy the peat replacement market. The composting of farm waste as a peat replacement is well understood and undergoing commercialization. Moreover, composting of farm waste is far more acceptable to the public than degraded Sites of Special Scientific Interest (SSSI) peat.

Another advantage of the present invention is that it may utilize dispersion polymers that contain no oil and therefore does not contribute adversely to the impact of the slurry on the environment.

Yet another advantage of the present invention is that both the latex and the dispersion polymers are easily diluted. As a result, the expenditure on dosing equipment is kept to a minimum.

Still further, an advantage of the present invention is that it not only dewaters and clarifies the agricultural waste water, it simultaneously removes potential pollutants, such as phosphorus and ammonia.

Additional features and advantages of the present invention are described in, and will be apparent from the detailed description of the presently preferred embodiments and the figures.

BRIEF DESCRIPTION OF THE DRAWINGS

FIGS. 1–16 illustrate graphically polymer dosage (ppm) versus filtrate volume (mls) for various polymer flocculents applied to dairy slurry pursuant to the method of the present invention.

FIG. 17 illustrates graphically results of polymer dosage (ppm) versus filtrate volume (mls) for the treatment of dairy slurry with two different polymer flocculents and a latex polymer flocculent.

DETAILED DESCRIPTION OF THE PRESENTLY PREFERRED EMBODIMENTS

Figure 3:
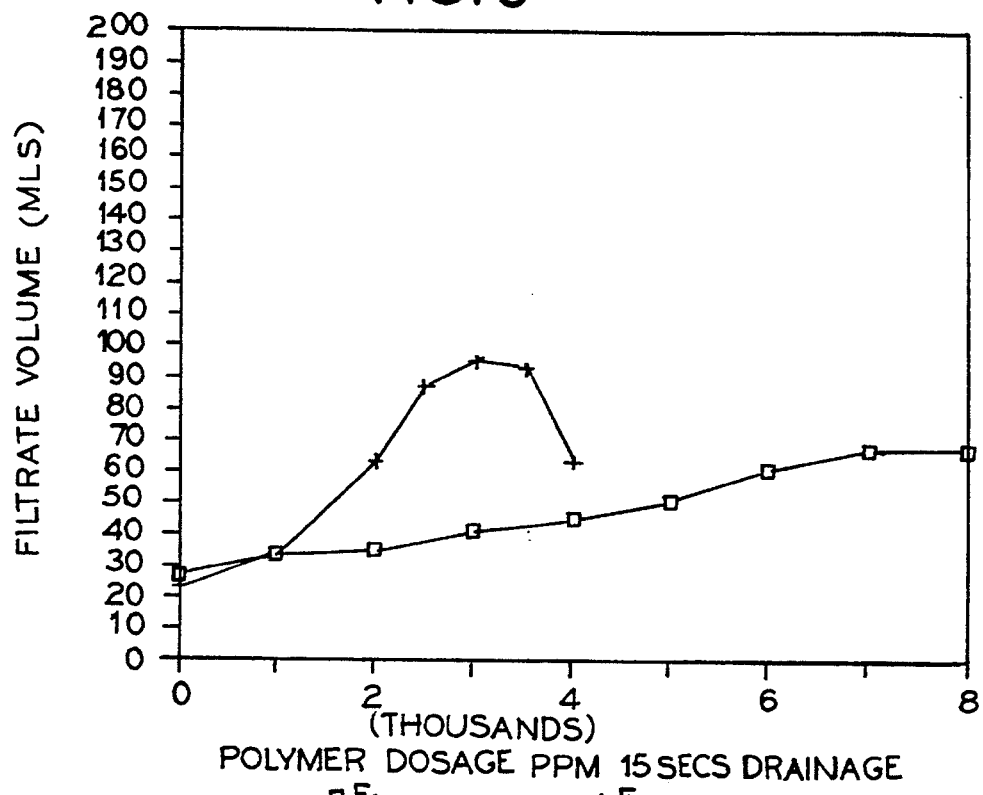

The present invention provides, for purifying agricultural waste, a method that includes the addition of a polymer flocculent, a coagulant, and a precipitant to agricultural waste. The flocculent component of the method effectively bridges suspended solids of the agricultural waste together. The coagulant component converts the dissolved solids into suspended solids, facilitating the removal of the solids. Lastly, the precipitant component facilitates the removal of unwanted soluble components from the agricultural waste. The three components in combination provide a unique chemical treatment method that effectively removes BOD, COD, ammonia, phosphate and solids to produce an environmentally acceptable agri-waste.

The polymer flocculent of the present invention is used to dewater composite waste, to increase dry solids content, and to generate waste for off-site disposal or use or for on-site storage for later fertilizer use or composting. Examples of suitable polymer flocculents that may be used in the present invention include latex polymers, such as Nalco 4762-SC, and dispersion polymers, such as Nalco CX2062.

Latex polymer flocculents can be obtained from a number of chemical suppliers such American Cyanamid, Buckman, Betz, Dearborn Chemical, Economic Laboratory, Inc., Merck, Nalco Chemical Company, Vineland Chemical, Dow Chemical, and Union Carbide.

The coagulant component of the present invention leads to the direct conversion of dissolved and colloidal solids to suspended solids. The active coagulant neutralizes charge on the surface of suspended solids, increasing settlement rate and facilitating flocculation. In addition, the coagulant component promotes co-precipitation of dissolved and colloidal solids onto the suspended solids template, reducing soluble biological and chemical oxidation demands of the final treated effluent.

Both inorganic as well as organic coagulants may be used in the present invention. Inorganic coagulants generally refers to coagulants containing only inorganic components, such as ferric or aluminum salts. Organic coagulants contain low molecular weight polymers. Organic coagulants may contain polymer only, or they may contain an inorganic coagulant as well. Examples of suitable coagulants that may be used in the present invention include: ferric sulphate; epichlorohydrin-dimethylamine condensation polymer in liquid form; polydiallyl-dimethyl ammonium chloride organic polymer in liquid or powder form; and mixtures thereof.

These coagulants can be obtained from a number of chemical suppliers such American Cyanamid, Buckman, Betz, Dearborn Chemical, Economic Laboratory, Inc., Merck, Nalco Chemical Company, Vineland Chemical, Dow Chemical, and Union Carbide.

The precipitant component of the present invention facilitates the removal of unwanted chemicals within the final effluent. Naturally, the particular type of precipitant chosen depends on the particular constituent that is to be removed from the agricultural waste. Two common unwanted chemicals found within agricultural waste are phosphate and ammonia. Precipitants that may be used to remove phosphate and ammonia are alkaline sodium aluminate liquor and acidic magnesium salt in phosphoric acid/magnesium phosphate solution, respectively.

The alkaline sodium aluminate liquor may be applied neat direct to filtrate or agricultural liquid waste. The soluble phosphate precipitates as sodium aluminum phosphate complex, as a component of the total suspended solids. The formation of the complex reduces the overall phosphate loading in the final treated effluent.

The acidic magnesium salt and phosphoric acid/magnesium phosphate solution may also be applied neat direct to filtrate or agricultural liquid waste. Similar to the soluble phosphate, the soluble ammonia precipitates as magnesium ammonium phosphate complex, as a component of the total suspended solids. The formation of the complex reduces the overall ammonia (nitrogen) loading in the final effluent.

The optimal amounts of the various components required for effectiveness of the method of the present invention depend on the type of agricultural waste being treated. For instance, the proper dosage required will differ when removing suspended solids from slurry as opposed to dairy washings. Likewise, the optimal amount of a particular component will depend on whether it is administered alone or in combination with the other components. Naturally, a larger amount of flocculent will be needed to remove suspended solids when administered alone than when administered with a coagulant. In addition, the concentration of the combined components varies greatly and can depend upon the conditions such as temperature and pH of the agricultural waste.

In an embodiment, the method comprises adding to slurry approximately 50 to 100 ppm (% actives) of the polymer flocculent to remove 1000 ppm of suspended solids. In another embodiment, the method comprises adding to slurry approximately 4 to 10 ppm (% actives) of the flocculent and 80 to 200 ppm (% actives) of the coagulant to remove 1000 ppm of suspended solids.

In another embodiment, the method comprises adding to dairy washings approximately 50 to 200 ppm of the coagulant and approximately 5 ppm of the flocculent. The treated dairy washings contained 1000 ppm COD and 350 ppm of suspended solids.

With respect to the precipitant, the optimal amount required to precipitate out unwanted chemicals from the agricultural waste depends on the unwanted chemical being removed. For example, in an embodiment, the method comprises adding 30 g of the precipitant for each 1 g of ammoniacal nitrogen along with 5 to 10 ppm of the flocculent. Use of the precipitant along with the flocculent effectively dewaters filtrate as well as clarifies the filtrate. In another embodiment, the method comprises adding approximately 12 to 15 g of the precipitant for each 1 g of soluble phosphate.

Pursuant to the method of the present invention, agricultural waste can be purified and an environmentally acceptable agri-waste is simultaneously produced. In an embodiment, the method of the present invention involves the addition of at least one polymer flocculent, at least one coagulant, and at least one precipitant to the agricultural waste. While the combined addition of these various components provides a complete chemical treatment method, the individual components can be added separately for the desired removal of selected constituents or in selected combinations.

The flocculent component of the present invention can be applied to composite waste slurry, stored or screened solids, or to filtrate produced by dewatering. In an embodiment, the flocculent is injected into the agricultural waste. The flocculent may be added with or without a dilution system. The active polymer bridges suspended solids leading to optimal dewatering of solids as well as optimal clarification of filtrate liquors.

The coagulant portion of the present invention is applied to the filtrate produced by dewatering of the agricultural waste slurry, or to agricultural liquid waste. Similar to the flocculent, the coagulant can be injected into the agricultural waste with or without dilution.

The precipitant portion of the present invention is applied neat direct to the filtrate or agricultural liquid waste. The precipitants not only facilitate the removal of unwanted chemicals but also allow optimal flocculation and settlement of solids.

By way of example, and not limitation, experimental examples of the present invention will now be given.

EXAMPLES

Experiments were conducted on effluent composition obtained from the Holme Lacy Farm at the Hereford College of Agriculture at Holme Lacy, Hereford, United Kingdom.

Under present operations, the effluent is collected in two fractions. The dairy washings, waste milk and cow urine and faeces from the milking parlor are piped, together with other farmyard runoff, into a lagoon. The use of the dairy washings to irrigate nearby fields periodically reduces the lagoon level. The higher solids effluent, i.e. farmyard scrapings, is collected into a slurry pit and pumped into a holding tank. This material is normally spread on the fields in autumn and winter months.

Various samples were collected for purposes of evaluating the dewatering and clarification ability of the present invention. The samples were collected at selected intervals throughout the day in order to obtain composites approximating the waste deposited in the holding tanks. Dairy washings were used for the clarification testing; whereas, composite slurry was used for the dewatering test.

Twenty four hour composite dairy washings were used in the clarification work. Samples of washings were collected at the outflow pipe into the lagoon. These were collected over a half day period, assuming the farm routine to be the same for each milking time. Flow rate of the effluent was monitored to determine the correct amount of effluent to collect from each period of the day, in order to obtain a composite approaching that of a 24 hour holding tank. The pH of the dairy washings composite was 7.4, and the clarity was 4/46 (using a clarity wedge).

Composite slurry was used throughout the dewatering tests. This was made up fresh each day. It consisted of a 1:1:2 ratio of farmyard scrapings, 24 hour composite dairy washings and tap water. The tap water was added to the testing tube to account for the contribution of rain water in normal effluent. The slurry was mixed until homogeneous and a blank test was run with the fresh composite to check the consistency. If the filtrate volumes were too high, more farmyard scrapings were added. If the filtrate volumes were too low, the composite slurry was diluted using a 1:2 ratio of dairy washings and tap water.

The following test results set forth the performance of the present invention in two areas: the clarification of dairy washings, and the dewatering of dairy farm slurry. The following results not only illustrate the effectiveness of the polymer flocculents of the present invention, but also compare the performance of such flocculents with traditional latex polymers. In addition to the dewatering tests, tests were conducted to determine the effectiveness of the coagulant and precipitant components of the present invention to clarify dairy washings.

The dispersion polymers as well as the latex polymers utilized in the experiments were produced according to standard procedures. The latex polymers were made up as follows. Latex polymers were usually made up as 1% solutions and then further diluted if required. 198 ml of distilled water was placed in a 400 ml beaker. An electric hand mixer was put in the beaker and switched on. The latex polymer sample was shaken vigorously to ensure homogeneity and 2 ml was drawn up into a disposable syringe. This was then discharged into the vortex of the water. The solution was mixed with the hand mixer for 30 seconds and left to age for 20 minutes.

The dispersion polymers were made up as follows. The appropriate amount of product was measured using a disposable syringe and this was then added to distilled water while stirring at full speed with a domestic hand mixer. The solution was mixed for 30 seconds and allowed to age for 10 minutes.

The testing procedures that were utilized in the various stages of the experiments are as follows.

Clarification Testing

Jar testing was carried out using a Voss flocculator (4 paddle variable speed stirrer). Sample volume was 500 ml of 24 hour composite dairy washings. Test conditions were as follows. Coagulant was added and mixed at full power (240 rpm) for one minute. Flocculent was added and mixed at full power (240 rpm) for one minute. Speed was reduced to minimum (400 rpm) for 5 minutes. Suspension was allowed to settle for 5 minutes.

Floc size, settling rate, supernatant quality and clarity (using a clarity wedge) were assessed. In addition, COD, BOD, suspended solids and ammonia levels were measured for the optimized treatments.

Evaluation of the Performance of Precipitant Addition

The performance of the precipitant was measured. The product was tested on clarified effluent obtained from several treatment regimes.

A particular precipitant, namely acidic magnesium salt and phosphoric acid (magnesium phosphate solution), was utilized in the present experiments. This particular magnesium salt can be obtained from Nalco Chemical Company under the trademark Nalco Magphos 30. The Magphos 30 was utilized to remove ammonia from the tested waste. The dosage of Magphos 30 required to remove ammonia is approximately 30 grams of product for 1 gram of ammoniacal nitrogen (as $NH_4N$).

The amount of ammonia present in the sample was determined using the Nesslers Reagent test. The required amount of Magphos 30 was then calculated. Slowly stirring the sample, the Magphos 30 was added over a period of 5 minutes. During this time, pH was monitored and caustic soda (47%) was added to adjust the pH to approximately 9. The sample was left to react for 30 minutes and then filtered. The ammonia level was then measured again.

Dewatering Testing

The ability of products to facilitate dewatering was evaluated using the "free drainage test." The free drainage test stimulates conditions in the free drainage area on a twin belt press. The free drainage test was conducted as follows.

The free drainage test equipment consisted of: a 15 cm diameter plastic funnel held in a polypropylene funnel holder over a 250 ml graduated measuring cylinder. A 25 cm×25 cm sample of twin belt press belt material was rested on top of the funnel and held in place by a 10 cm diameter× 7.5 cm high stainless steel cylinder.

A 250 ml volume of the composite slurry was put in a 1 liter beaker and agitated using the Voss flocculator at 250 rpm. The chemical treatment was added, in a volume made up to 50 mls with tap water. This was mixed for 1 minute, then poured into the stainless steel cylinder and the stop watch started. The filtrate was collected in the graduated measuring cylinder and the volume recorded at 5, 10 and 15 seconds drainage time. After 15 seconds, the stainless steel cylinder was removed and the belt material tilted to an angle of 45 degrees. The residual cake was assessed qualitatively on a scale from 1–4 for dryness and stability (1: poor, runny, 4: very dry stable).

Polymer dose was calculated as follows:

$$\text{Polymer dose mg/l or ppm} = \frac{\left( \text{poly solution volume (ml)} \times \frac{\text{poly solution strength (\%)}}{100} \right)}{\text{sludge volume (ml)} + \text{dilution volume (50 ml)}}$$

Blanks were run to attain the base line filtrate rate. These consisted of 250 ml of composite slurry and 50 ml of tap water. The usual method was followed. Blanks were run regularly to check consistency of the composite slurry and also to check the performance of the belt material.

EXPERIMENTAL DATA

CLARIFICATION OF DAIRY WATERINGS

A range of coagulants was tested, the best being ferric sulphate ("$C_1$"), ferric sulphate and Epi-DMA polymer blend ("$C_2$"), and Epi-DMA polymer ("$C_3$").

Likewise, a range of flocculents was tested, either alone or in conjunction with coagulants. One of the best latex performers was $F_{44}$. The $F_{44}$ product is a latex polymer and can be obtained from Nalco Chemical Company under the trademark Nalco 4762-SC. This gave the best supernatant clarity with good floc size and good floc settling rate. The performance of $F_{44}$ was compared to $F_{26}$, which is one of the dispersion polymers, and the latter found to perform better.

On the basis of these screening tests, four superior treatment regimes were determined all of which gave good performance. Optimal dosage regimes were as follows:

| Coagulant | Dosage | Flocculent | Dosage |
| --- | --- | --- | --- |
| 1. $C_1$ | 1000 ppm | $F_{26}$ | 5 ppm |
| 2. $C_2$ | 700 ppm | $F_{26}$ | 5 ppm |
| 3. $C_3$ | 150 ppm | $F_{26}$ | 5 ppm |
| 4. $C_3$ | 150 ppm | $F_{26}$ | 40 ppm |

All of the above regimes gave good clarity. In treatment No. 1 the supernatant was clear and water-white, whereas in the other treatments the supernatant was clear but had a brown-yellow coloration. The floc size was good in all of the above regimes, but with some the flocs floated and with others the flocs sank. The preferable regime is largely dependent on the separator design.

The results of the analysis of filtrates from the above clarification regimes are reported in TABLE 1.

TABLE 1

| Analysis of clarified dairy washing | | | |
| --- | --- | --- | --- |
| Dosage Regime | COD ppm | BOD ppm | Suspended Solids ppm |
| Untreated | 990 | 890 | 360 |
| 1 | 280 | 581 | 11 |
| 2 | 278 | 308 | 38 |
| 3 | 411 | 430 | 70 |
| 4 | 458 | 481 | 38 |

The effect of pH adjustment to chemical addition was also investigated. Screening was performed at pH 5, 7 (the natural pH of the dairy washings) and 12, but no benefits were noted from lowering or raising the pH.

The results from the precipitant (Magphos 30) trials are reported in TABLE 2. Samples were retained and taken back to the laboratory after a weekend, at which point it was noted that the samples were cloudy. These were refiltered, retested and found to contain only very low levels of ammonia. These final ammonia levels were within the consent limits proposed by the NRA.

TABLE 2

| Ammonia content of clarified dairy washings | | | |
| --- | --- | --- | --- |
| Dosage Regime | Ammonia (as $NH_4N$) pre-Magphos ppm | Ammonia (as $NH_4N$) post-Magphos ppm | Ammonia (as $NH_4N$) 72 hours post-Magphos ppm |
| Untreated | 170 | 180 | 64 |
| 1 | 170 | 64 | 8 |
| 2 | 170 | 96 | 8 |
| 3 | 170 | 88 | 8 |
| 4 | 170 | 88 | 8 |

DEWATERING OF FARM SLURRY

Figure 4:
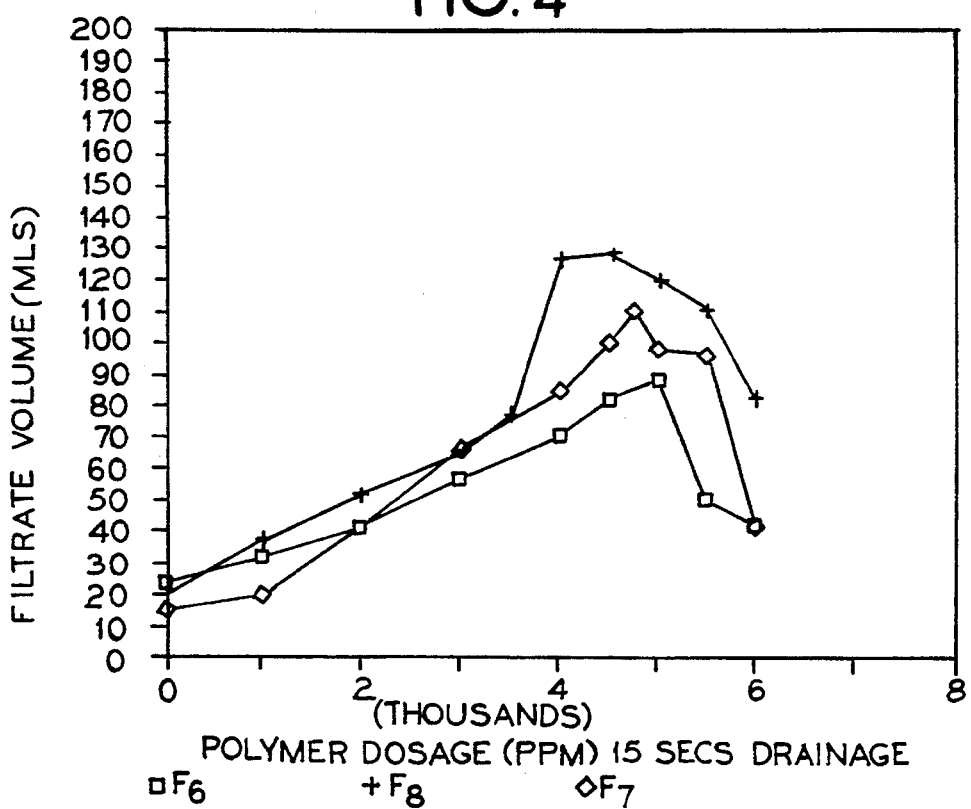
Figure 5:
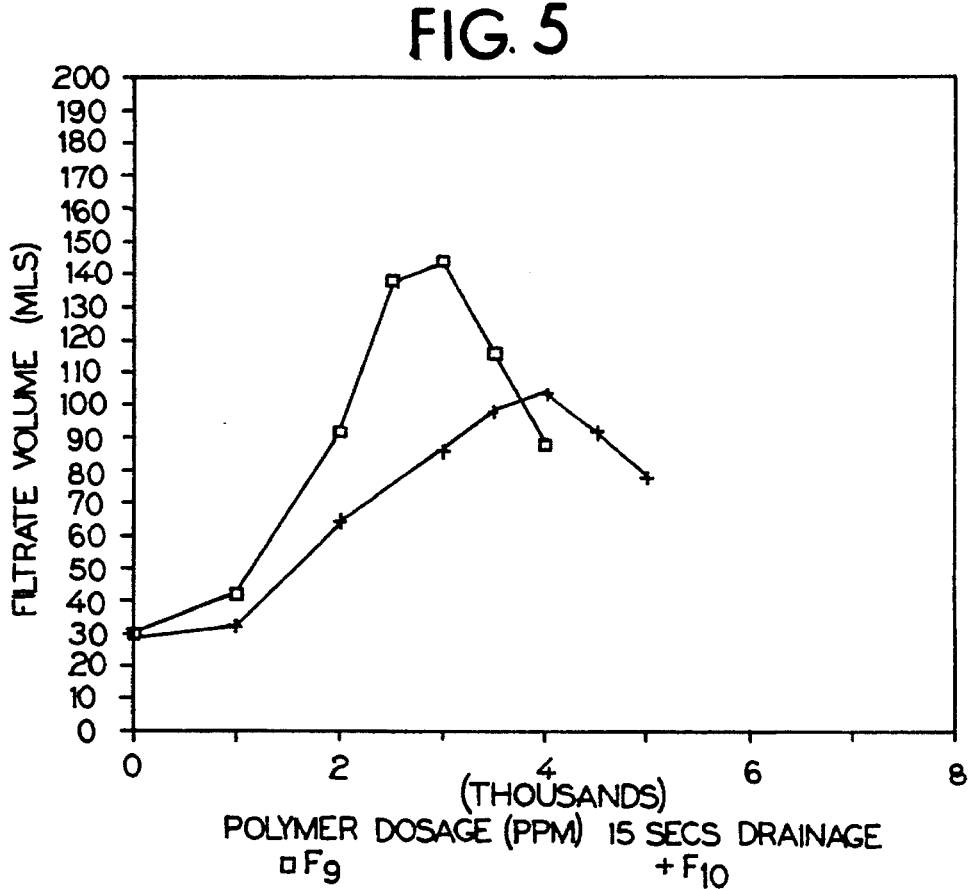
Figure 6:
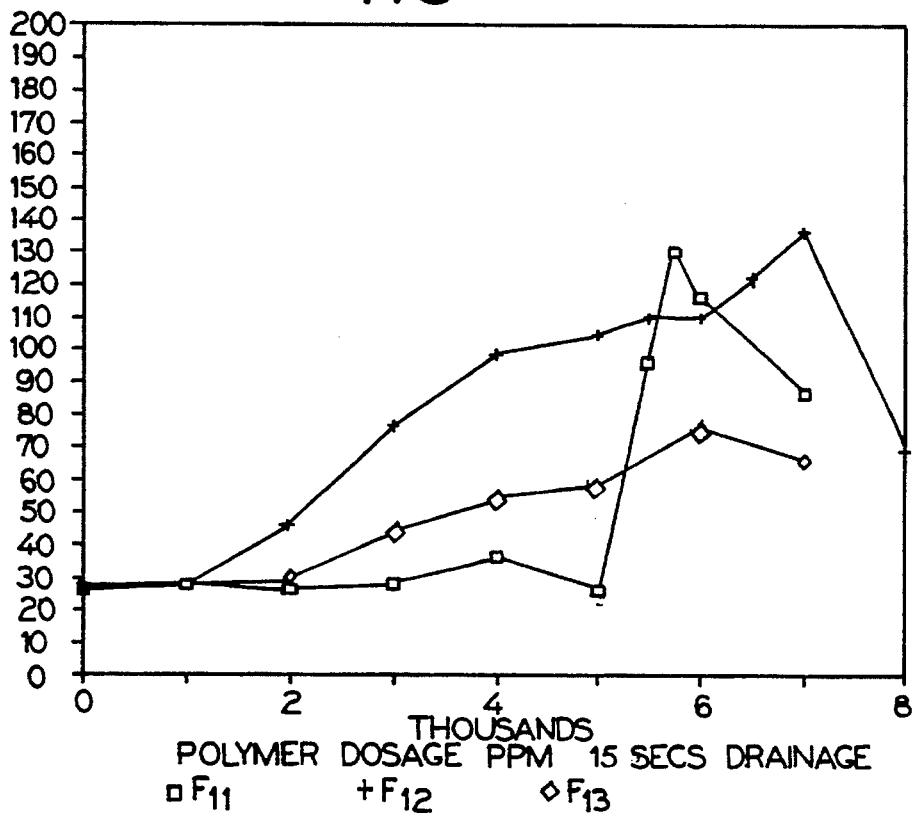
Figure 13:
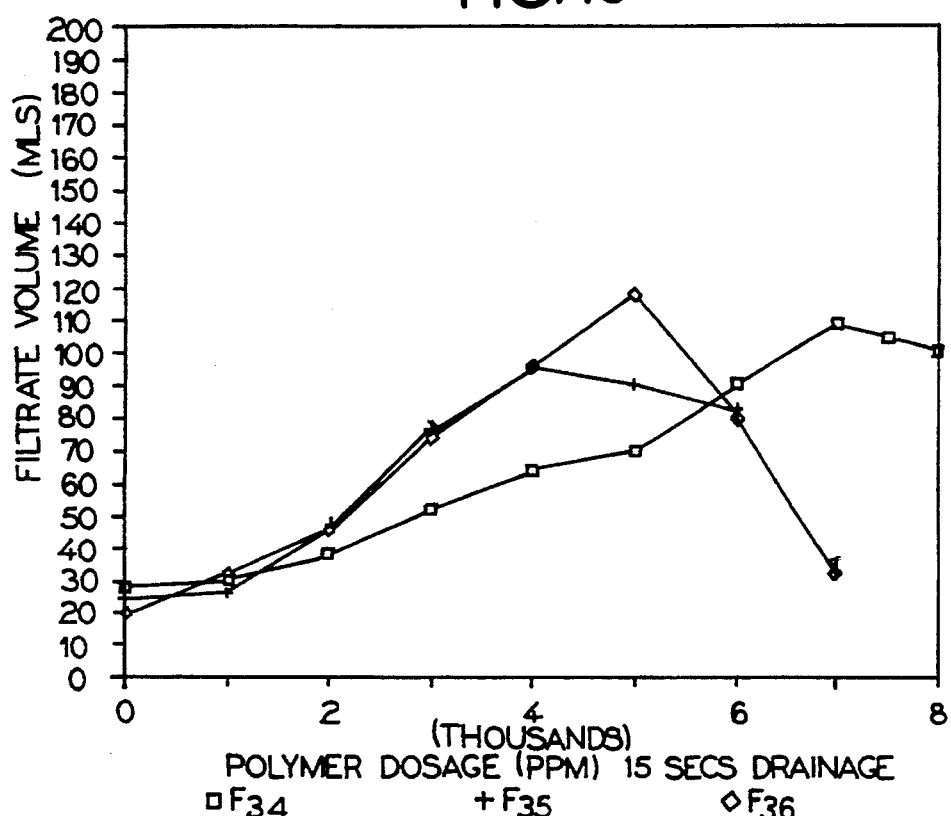
Figure 14:
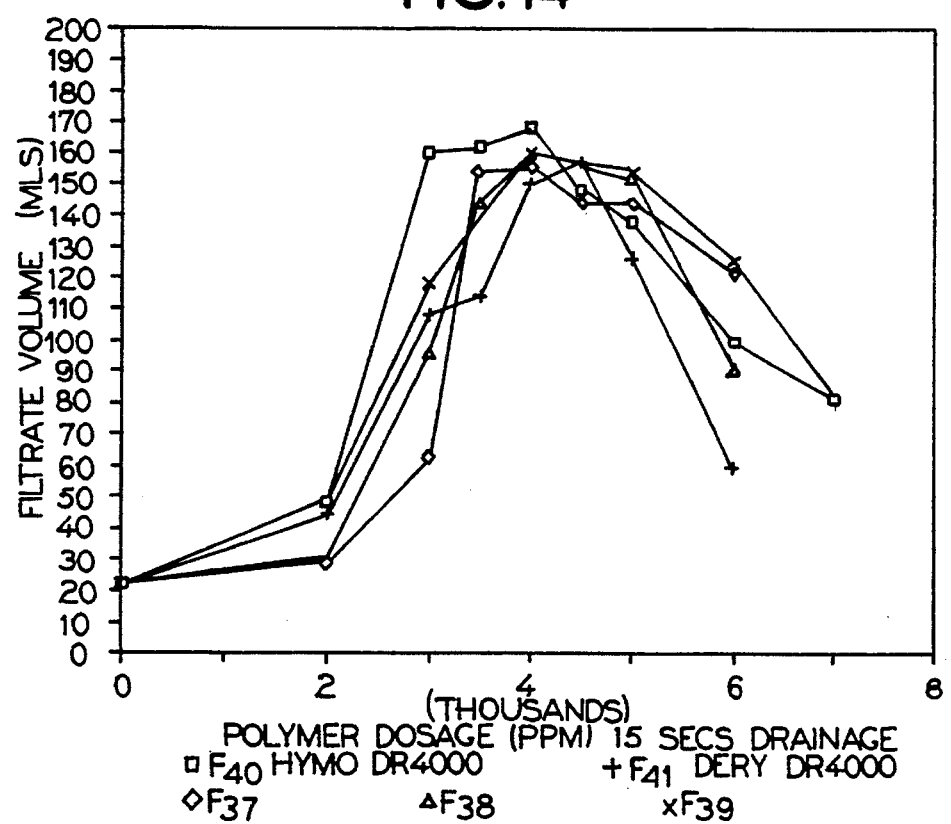
Figure 15:
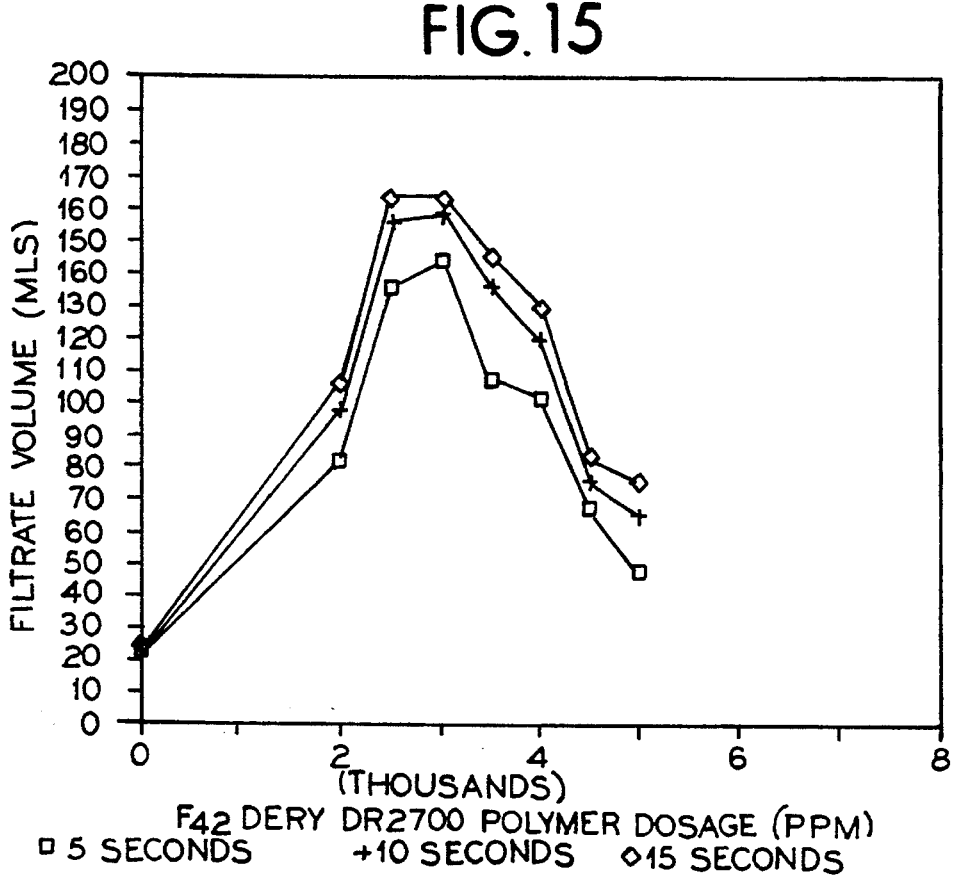
Figure 16:
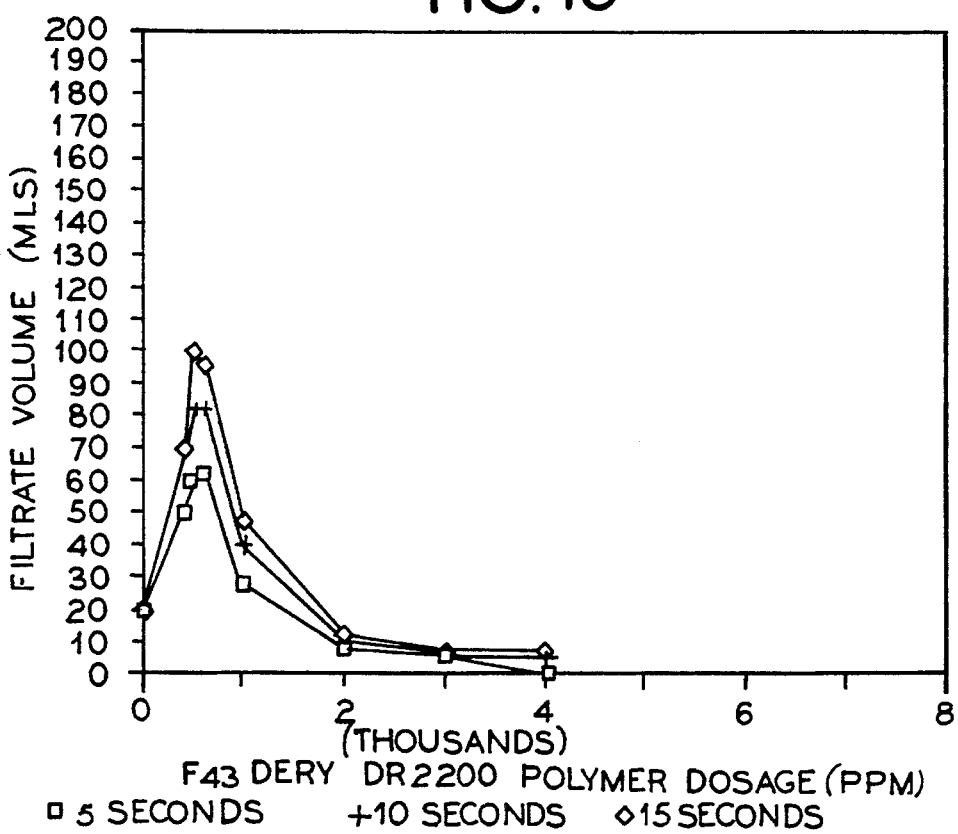

The results of the dewatering tests are presented in TABLE 3 and in the form of graphs (FIGS. 1–17) relating to the testing of a variety of dispersion polymer products, and a latex polymer ($F_{44}$). The flocculents tested were all high molecular weight acrylamide copolymers. The latex polymers are water in oil emulsion polymers.

The dispersion polymers are polymers dispersed in an aqueous phase. The description of the various dispersion polymer products utilized in the experiments are listed in TABLE 4. The dispersion polymers are characterized by the % actives, the polymer composition as regards monomer ratio (acrylamide/dimethylaminoethyl benzyl chloride quat./ dimethylaminoethylacrylate methyl chloride quat.) and the IV (intrinsic viscosity). The specific monomer ratio and the IV distinguishes the different compositions at various % actives. IV is dependent upon polymer chain length and gives an indication of the molecular weight distribution. On the graphs all axes are to the same scale to facilitate cross-reference.

TABLE 3

Dewatering of Farm Slurry-results

| CX# | Best result Filtrate rate mls/15 secs | Best result Cake quality (1–4) (1 = Poor, 4 = Best) | Best result Filtrate quality (1–4) (1 = Poor, 4 = Best) |
|---|---|---|---|
| $F_1$ | 86 | 2 | 1 |
| $F_2$ | 148 | 3 | 1 |
| $F_3$ | 34 | 1 | 1 |
| $F_4$ | 78 | 1 | 1 |
| $F_5$ | 96 | 2 | 1 |
| $F_6$ | 90 | 2 | 1 |
| $F_7$ | 112 | 3 | 1 |
| $F_8$ | 130 | 3 | 1 |
| $F_9$ | 144 | 3 | 1 |
| $F_{10}$ | 104 | 3 | 1 |
| $F_{11}$ | 130 | 3 | 1 |
| $F_{12}$ | 136 | 2 | 1 |
| $F_{13}$ | 76 | 2 | 1 |
| $F_{14}$ | 28 | 1 | 1 |
| $F_{15}$ | 74 | 1 | 1 |
| $F_{16}$ | 96 | 3 | 1 |
| $F_{17}$ | 98 | 2 | 1 |
| $F_{18}$ | 108 | 2 | 1 |
| $F_{19}$ | 90 | 3 | 1 |
| $F_{20}$ | 130 | 3 | 1 |
| $F_{21}$ | 158 | 2 | 1 |
| $F_{22}$ | 124 | 3 | 1 |
| $F_{23}$ | 152 | 2 | 1 |
| $F_{24}$ | 178 | 3 | 1 |
| $F_{25}$ | 142 | 3 | 3 |
| $F_{26}$ | 168 | 3 | 1 |
| $F_{27}$ | 160 | 3 | 1 |
| $F_{28}$ | 152 | 3 | 1 |
| $F_{29}$ | 90 | 1 | 1 |
| $F_{30}$ | 92 | 2 | 1 |
| $F_{31}$ | 138 | 3 | 1 |
| $F_{32}$ | 114 | 3 | 1 |
| $F_{33}$ | 100 | 2 | 1 |
| $F_{34}$ | 108 | 3 | 2 |
| $F_{35}$ | 96 | 2 | 1 |
| $F_{36}$ | 118 | 2 | 1 |
| $F_{37}$ | 156 | 3 | 1 |
| $F_{38}$ | 160 | 3 | 1 |
| $F_{39}$ | 160 | 3 | 1 |
| $F_{40}$ | 168 | 3 | 1 |
| $F_{41}$ | 158 | 3 | 1 |
| $F_{42}$ | 164 | 2 | 1 |
| $F_{43}$ | 100 | 1 | 1 |
| $F_{44}$ | 38 | 3 | 1 |

TABLE 4

DISPERSION POLYMERS TESTED FOR PERFORMANCE ON THE DEWATERING OF FARM SLURRY

| CX# | POLYMER COMPOSITION AcAM/DMAEA. BCQ/DMAEA. MCQ(mole %) | | IV dL/gm |
|---|---|---|---|
| $F_1$ | 90/5/5 | 10% actives | 8.0 |
| $F_2$ | 90/10/0 | 15% actives (HYMO DR 2570) | 14.8 |
| $F_3$ | 90/10/0 | 15% actives (DERYPOL DR 2500) | 10.2 |
| $F_4$ | 85/15/0 | 15% actives | 14.4 |
| $F_5$ | 85/15/0 | 15% actives | 8.6 |
| $F_6$ | 80/20/0 | 20% actives | 15.8 |
| $F_7$ | 80/20/0 | 20% actives | 12.8 |
| $F_8$ | 80/20/0 | 20% actives | 6.4 |
| $F_9$ | 80/10/10 | 10% actives | 16.2 |
| $F_{10}$ | 80/10/10 | 10% actives | 6.4 |
| $F_{11}$ | 70/30/0 | 20% actives | 14.8 |
| $F_{12}$ | 70/30/0 | 20% actives | 10.6 |
| $F_{13}$ | 70/30/0 | 20% actives | 6.2 |
| $F_{14}$ | 70/20/10 | 20% actives | 15.7 |
| $F_{15}$ | 70/20/20 | 20% actives | 12.2 |
| $F_{16}$ | 70/20/10 | 20% actives | 6.8 |
| $F_{17}$ | 70/15/15 | 20% actives | 16.2 |
| $F_{18}$ | 70/15/15 | 20% actives | 14.2 |
| $F_{19}$ | 70/15/15 | 20% actives | 11.0 |
| $F_{20}$ | 65/20/15 | 20% actives | 17.7 |
| $F_{21}$ | 65/20/15 | 20% actives | 13.1 |
| $F_{22}$ | 65/20/15 | 20% actives | 10.8 |
| $F_{23}$ | 65/25/10 | 20% actives | 19.6 |
| $F_{24}$ | 65/25/10 | 20% actives | 15.6 |
| $F_{25}$ | 65/25/10 | 20% actives | 8.2 |
| $F_{26}$ | 65/25/10 | 20% actives (HYMO DR 3000) | 17.6 |
| $F_{27}$ | 65/25/10 | 20% actives (DERYPOL DR 3000) | 12.2 |
| $F_{28}$ | 50/50/0 | 20% actives | 10.6 |
| $F_{29}$ | 50/50/0 | 20% actives | 4.3 |
| $F_{30}$ | 50/50/0 | 20% actives | 2.6 |
| $F_{31}$ | 50/25/25 | 20% actives | 14.6 |
| $F_{32}$ | 50/25/25 | 20% actives | 10.0 |
| $F_{33}$ | 50/25/25 | 20% actives | 7.8 |
| $F_{34}$ | 50/40/10 | 20% actives | 14.8 |
| $F_{35}$ | 50/40/10 | 20% actives | 6.8 |
| $F_{36}$ | 50/40/10 | 20% actives | 4.6 |
| $F_{37}$ | 20/50/30 | 20% actives | 11.2 |
| $F_{38}$ | 20/50/30 | 20% actives | 9.4 |
| $F_{39}$ | 20/50/30 | 20% actives | 8.1 |
| $F_{40}$ | 20/50/30 | 20% actives (HYMO DR 4000) | 10.3 |
| $F_{41}$ | 20/50/30 | 10% actives (DERYPOL DR 4000) | 8.8 |
| $F_{42}$ | 75/20/5 | 15% actives (DERYPOL DR 2700) | 12.0 |
| $F_{43}$ | 90/30/0 | 15% actives (DERYPOL DR 2200) | 10.9 | contains 7 moles % Ethyl acrylate

The best performance was gained from the $F_{25}$ composition, although at a very high dosage. This gave a good consistency of cake and was the only product to give a good (qualitative assessment) quality of filtrate.

The $F_{26}$ product performed well but no better than others of the same composition. It gave good cake consistency but poor filtrate quality. The $F_{26}$ product was chosen for further study because it is already commercially available. $F_{26}$ may be obtained from Hymo under the trademark DR 3000. Analysis of the filtrates is presented in TABLE 5.

TABLE 5

Analysis of filtrates from optimal dewatering treatments

| Dosage Regime | COD ppm | BOD ppm | Suspended Solids ppm | Dissolved Solids ppm |
|---|---|---|---|---|
| Untreated Slurry | 28810 | 5355 | 16650 | 8920 |
| $F_{25}$ 6000 ppm | 2310 | 2000 | 91 | 5670 |

TABLE 5-continued

Analysis of filtrates from optimal dewatering treatments

| Dosage Regime | COD ppm | BOD ppm | Suspended Solids ppm | Dissolved Solids ppm |
|---|---|---|---|---|
| $F_{26}$ 3000 ppm | 11560 | 4550 | 10930 | 7000 |

From the analysis, the filtrate from the $F_{25}$ treatment is indeed shown to be far superior to the $F_{26}$ filtrate. Suspended solids is very low therefore dosages required for the clarification of the filtrate would be expected to be low. BOD and COD are also substantially reduced, presumably due to the flocculation of the insoluble fraction.

The performance of $F_{44}$, the best performer out of the latexes tested in these experiments, was compared to $F_{26}$. Refer to FIG. 17 for a comparison of filtration rates. The following scale correlates to the qualitative assessment of filtrate and cake represented in FIG. 17:

(1) Filtrate assessment of $F_{25}$
(2) Cake assessment of $F_{44}$
(3) Cake assessment of $F_{26}$
(4) Cake assessment of $F_{25}$ Filtration rates achieved with $F_{44}$ (best performance) was 168 mls. in 15 secs. $F_{44}$ had a narrower range of effective dosage than $F_{26}$. Filtrate quality (poor) and cake quality (good) were similar for both treatments. Dosage on an actives/actives basis was very similar, 400–900 ppm actives of $F_{26}$ gave good filtrate rates compared to 500–700 ppm actives of $F_{44}$.

EXPERIMENTAL RESULTS

CLARIFICATION OF DAIRY WASHINGS

The experimental data, detailed above, illustrates that the present invention effectively removes BOD, COD, ammonia and solids from agricultural waste. Utilizing the method of the present invention significantly reduces the levels of such parameters as well as the level of suspended solids.

On treating the dairy washings with the best of the proposed chemical treatment regimes, suspended solids were significantly reduced to below, or very close to, the limit of <30 ppm proposed by the NRA. Likewise, the final ammonia levels were reduced to within the proposed NRA limit of <20 ppm.

The BOD and COD levels were also reduced significantly, although compliance with the limit of 20 ppm proposed by the NRA was not achieved. However, it is unlikely that these limits will be reached by chemical treatment alone. If proposed standards for BOD and COD levels are to be achieved, a requirement will likely exist for a biologically active stage as an add-on.

DEWATERING OF FARM SLURRY

Many of the 20% actives/high percentage charge products performed well, with high filtrate volumes over a wide range of dosages, specifically in the 20/50/30 20% actives group and the 65/25/10 20% actives group. Apart from the filtrate rates, other factors governing selection of the best performer were filtrate clarity and cake quality. These were rated on a scale of 1 to 4 and most products achieved good quality cakes. However, the filtrates from all but one product were very poor, containing over half of the original suspended solids loading. The filtrate from the $F_{25}$ composition was noticeably better quality, but this was achieved by very high dosage, 1200 ppm actives.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A settlement method for treating agricultural liquid waste to provide a purified effluent portion and a dewatered organic mass ready for composting, said method comprising the steps of:

providing agricultural liquid waste to be treated;

treating the agricultural liquid waste by adding a polymer flocculent selected from the group consisting of latex polymers and dispersion polymers, an organic coagulant selected from the group consisting of an epichlorohydrin-dimethylamine condensation polymer and a polydiallyl-dimethylammonium chloride polymer, alone or in combination, with an inorganic coagulant, and a precipitant selected from the group consisting of an alkaline sodium aluminate liquor, an acidic magnesium salt in phosphoric acid/magnesium phosphate solution, and mixtures of the foregoing precipitants to form a mixture;

mixing the mixture to provide a treated liquid waste; and permitting the treated liquid waste to settle to form a purified effluent portion and a dewatered organic mass.

2. The method of claim 1, wherein polymer flocculent, coagulant and precipitant are added by directly injecting the flocculent, coagulant and precipitant into the agricultural liquid waste.

3. The method of claim 2 wherein the steps of directly injecting the flocculent and coagulant are completed with a dilution system.

4. The method of claim 2 wherein the steps of directly injecting the flocculent and coagulant are completed without a dilution system.

5. The method of claim 1 wherein the flocculent is added prior to the coagulant and precipitant.

6. The method of claim 1 wherein the flocculent, the coagulant, and the precipitant are added simultaneously.

7. The method of claim 1 wherein the amount of flocculent added ranges from about 4 to 10 ppm (% actives), and the amount of coagulant ranges from about 50 to 200 ppm (% actives).

8. A method as defined in claim 1, wherein the agricultural liquid waste is a composite waste slurry including farmyard scrapings, dairy washings and water and the flocculent is added to said slurry in an amount of about 4 to 10 ppm (% actives) and the coagulant is added in an amount of 80 to 200 ppm (% actives) per every 1000 ppm of suspended solids present in said slurry.

9. A method as defined in claim 1, wherein the agricultural liquid waste is dairy washings and the flocculent is added at about 5 ppm and the coagulant is added at about 50 to 200 ppm.

10. A method as defined in claim 1, wherein 30 grams of acidic magnesium salt precipitant are added for each 1 gram of ammoniacal nitrogen and 12 to 15 grams of alkaline sodium aluminate liquor are added for each 1 gram of soluble phosphate present in the agricultural liquid waste.

11. A settlement method for treating agricultural liquid waste to provide a purified effluent portion and a dewatered organic mass ready for composting, said method comprising the steps of:

provinging agricultural liquid waste to be treated;

treating the agricultural liquid waste by adding a polymer flocculent selected from the group consisting of latex polymers and dispersion polymers and an organic coagulant selected from the group consisting of an epichlorohydrin-dimethylamine condensation polymer and a polydiallyl-dimethylammonium chloride polymer, alone or in combination, with an inorganic coagulant to form a mixture;

mixing the mixture to provide a treated liquid waste;

permitting the treated liquid waste to settle to form a purified effluent portion and a dewatered organic mass; ad adding to the effluent portion a precipitant selected from the group consisting an alkaline sodium aluminate liquor, an acidic magnesium salt in a phosphoric acid/magnesium phosphate solution, and mixtures of the foregoing precipitants and permitting a phosphorus precipitate and ammonia precipitate or both, respectively, to settle out of the effluent portion to provide a purified effluent portion.

* * * * *